United States Patent Office 2,975,213
Patented Mar. 14, 1961

2,975,213
PRODUCTION OF DIALKYLIDENE-P-PHENYLENE-DIAMINES

Robert W. Layer, Cuyahoga Falls, Ohio, assignor to The B. F. Goodrich Company, New York, N.Y., a corporation of New York No Drawing. Filed June 12, 1957, Ser. No. 665,113

3 Claims. (Cl. 260—566)

This invention relates to the production of a class of chemicals capable of retarding the deterioration of oxidizable organic materials when exposed to light, moisture and/or air. More particularly, this invention relates to processes for the commercial production of N,N'-dialkyl-p-phenylenediamines of high quality and at a low cost.

It has heretofore been proposed to alkylate p-phenylenediamine by reductive alkylation processes comprising treating a mixture of p-phenylenediamine and a carbonyl compound with hydrogen, in the presence of a hydrogenation catalyst, under high pressures over long periods of time.

Further, in the prior single step reductive alkylation processes hereinabove referred to, it is necessary to utilize a high pressure reactor with its ancillary equipment, to develop and withstand high pressures of hydrogen gas up to 2,000 or more p.s.i., over periods as long as from 18 hours to 36 hours. The utilization of such high pressure equipment which is expensive to build and expensive to operate over these long periods of time, results in an inordinately high cost for producing a N,N'-dialkyl-p-phenylenediamine.

It is the purpose of the present invention to produce commercially in high yields, with a minimum of by-products and at a low cost, N,N'-dialkyl-p-phenylenediamines. It is further an object of this invention to minimize the length of time needed for the carrying out of the high pressure hydrogenation process.

Applicant has discovered that p-phenylenediamine readily reacts, in an inexpensive non-pressured reactor without a catalyst, with a carbonyl compound, such as a ketone or an aldehyde, to produce an intermediate, namely, N,N'-dialkylidene-p-phenylenediamine     (1)

and that the intermediate compound (1) above is rapidly hydrogenated under pressure in the presence of a hydrogenation catalyst to the end product, namely, N,N'-dialkyl-p-phenylenediamine     (2)

By way of illustration, the rate curve for the reaction of p-phenylenediamine with a typical ketone, is methylhexyl ketone, to give the intermediate (1) above is as follows:

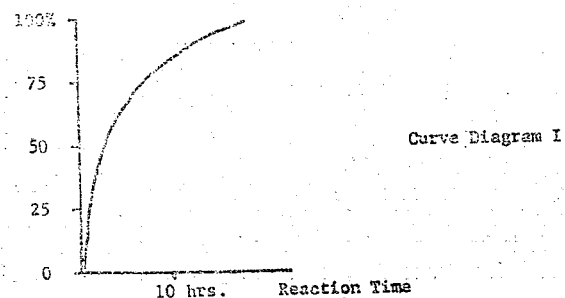

Curve Diagram I

Similarly, the rate curve for the reaction of p-phenylenediamine with a typical aldehyde, 2-ethylhexanal, to give the intermediate (1) above is as follows:

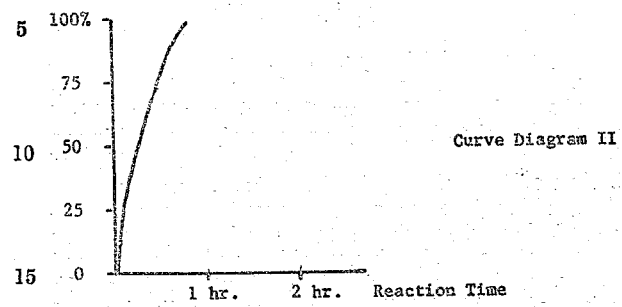

Curve Diagram II

It will be noted that the aldehyde reaction is much more rapid than the ketone reaction in forming with p-phenylenediamine the intermediate (1) above. However, it has been observed that the N,N'-dialkyl-p-phenylenediamines     (2)

which have been alkylated with ketones are somewhat more desirable in rubber products than the compound (2) above alkylated with aldehydes.

An alternative process for producing the intermediate product (1) above, is to react p-phenylenediamine with a ketone until the reaction substantially slows down, which occurs when the reaction is from about 60% to about 85% complete, generally within the first few hours (the extent of the reaction being measured by the volume of the water given off); then at any such point, add an aldehyde, preferably an alpha-alkyl aldehyde, in an amount necessary to complete the reaction. This is illustrated graphically in the following diagram:

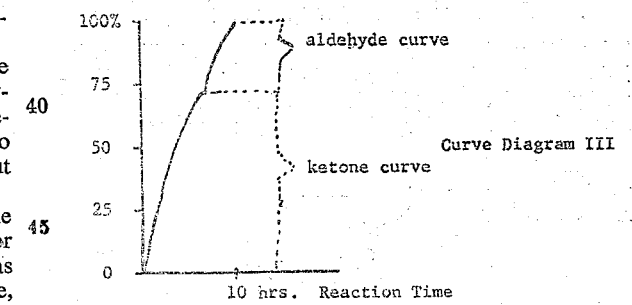

Curve Diagram III

The N,N'-dialkylidene-p-phenylenediamine, formed in accord with the process indicated above in any of the diagram curves I, II or III, is hydrogenated under pressure at an elevated temperature in the presence of a hydrogenating catalyst, such as barium oxide stabilized copper chromite ($CuCr_2O_4$) to produce the end product N,N'-dialkyl-p-phenylenediamine     (2)

In the production of the intermediate N,N'-dialkylidene-p-phenylenediamine, it is advantageous to utilize a molar ratio of carbonyl compound to p-phenylenediamine of more than 2:1, as high as an 8:1 ratio having given satisfactory results. The reaction is carried out in a non-pressured reactor, preferably with a slight vacuum in the reactor to facilitate the removal of the water liberated in the reaction and to maintain the liquid contents at a relatively low temperature, preferably not to greatly exceed 100° C. The vacuum pressure in the reactor is not critical, and atmospheric pressure is operative. However, a vacuum of from about 50 mm. to about 100 mm. of mercury may be advantageously employed, with a vacuum of 60 to 80 mm. being preferred. It has also been found desirable to have the carbonyl compound free from any acidity, and to this end it may be desirable to pretreat the carbonyl compound to remove any trace of acid.

In the production of the end product, N,N'-dialkyl-p-phenylenediamine, from the intermediate product by hydrogenation, the temperature employed may range from about 100° C. to 250° C., preferably from about 150° C. to about 200° C. and the hydrogen pressure may range from 150 p.s.i. to 3,000 p.s.i., preferably from about 600 p.s.i. to about 2,000 p.s.i. A temperature of 150° C. and a pressure of 1,500 p.s.i. have given satisfactory results. Any of the well-known hydrogenating catalysts may be employed. However, the barium oxide stabilized copper chromite ($CuCr_2O_4$), and a catalyst comprising an intimate mixture of copper oxide, chromium oxide and barium oxide, preferably in about 10:10:1 molar proportions, although other molar proportions may be employed, have been found to be advantageous. The amount of the catalyst is not critical and may be varied widely, as from about 0.5% to about 10.0% of the weight of the N,N'-dialkylidene-p-phenylenediamine, and normally about 5.0% has been found to give satisfactory results.

EXAMPLE I

The following is an example of the process of this invention in which N,N'-di-(1-methylheptyl)-p-phenylenediamine is produced in a two step process from 2-octanone and p-phenylenediamine.

*Step 1.*—Into a 2 liter 3-necked flask are placed 216 g. (2 moles) of p-phenylenediamine and 1 liter of 2-octanone, the flask heated to 80° C. and a slight vacuum (60–80 mm.) is applied to the flask to facilitate the removal of water and to avoid high reaction temperatures, the reaction mix being preferably kept at around 100° C. more or less. A record is kept of the reaction conditions so that an approximate estimate of the rate of reaction can be determined. The water removed from the flask is collected and measured. When 73 milliliters of water have been collected, it indicates that the reaction is substantially complete. The reaction product obtained is 660 g. of a dark liquid, the theoretical yield being 662 g. Upon vacuum distillation, the boiling point indicates the liquid to be relatively pure N,N'-di-(1-methyheptylidene)-p-phenylenediamine. The reaction of step 1 is represented by the following equation:

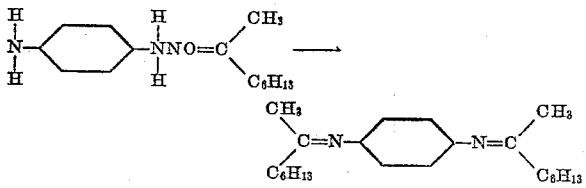

*Step 2.*—In an absolutely dry hydrogenation bomb is placed 96.7 g. of freshly distilled N,N'-di-(1-methylheptylidene)-p-phenylenediamine, produced in step 1, and 5 g. of barium oxide stabilized copper chromite catalyst, and hydrogen is admitted to the bomb, the hydrogenation being carried out at a temperature of about 150° C. and under about 1,500 p.s.i. of hydrogen pressure until no more hydrogen is absorbed. When the measurements indicate that 0.60 mole of hydrogen has been absorbed (the theoretical being 0.60 mole) the reaction is substantially complete. The reaction mixture is filtered to remove the catalyst, and is heated to remove any entrapped hydrogen. The resulting hydrogenation product is a dark viscous liquid which tests indicate to be relatively pure N,N'-di-(1-methylheptyl)-p-phenylenediamine. The reaction of step 2 is represented by the following equation:

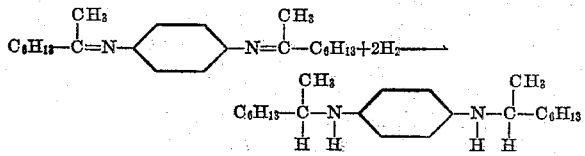

*Evaluation of N,N'-di-(1-methylheptyl)-p-phenylenediamine as a retarder of surface cracking*

The deterioration retarder of Example I is particularly effective as a retarder of surface cracking where the rubber composition in which it is incorporated is exposed out-of-doors to sunlight and air. Its efficiency is evaluated by incorporating it in a standard natural rubber test recipe, the rubber composition is cured in a steam press and subjected to a standard test. The test recipe employed is:

TEST RECIPE

| Constituents | Parts by Weight |
|---|---|
| Natural Rubber | 100.0 |
| Stearic Acid | 2.0 |
| Zinc Oxide | 5.0 |
| Carbon Black | 50.0 |
| Sulfur | 3.0 |
| Mercaptobenzothiazole (accelerator) | 1.0 |
| Retarder of Example I | 1.0 |

Two rubber stocks are compounded and vulcanized for comparison purposes: (a) the rubber stock of the above recipe; and (b) the rubber stock of the above recipe, without the deterioration retarder.

Each of the compounded rubber stocks is cured in a steam press at 284° F. for 60 minutes. As test pieces, strips about 3¾" by 1" are cut from the 1/16" thick press vulcanized slabs of the two rubber compositions (a) and (b). These strips are mounted side by side as "bent loops," formed by clamping the two ends of each strip between two wooden frames. These samples are exposed outdoors and inspected at intervals to determine the degree of surface cracking. The following are the results:

| | Surface Cracking After Outdoor Exposure For— | | |
|---|---|---|---|
| | 2 Days | 30 Days | 60 Days |
| Rubber Stock (a), Retarder of Example I | None | None | Very Slight. |
| Rubber Stock (b), No Retarder | Slight | Severe | Very Severe. |

From these tests, the very effective crack-retarding properties imparted to the rubber stock (a) by the N,N'-di-(1-methylheptyl)-p-phenylenediamine of Example I on exposure to outdoor light and air are plainly demonstrated.

In carrying out the above process, other ketones may be employed as the starting carbonyl compound. Thus, where 2-butanone, which is methylethyl ketone, is reacted with p-phenylenediamine in accord with step 1 of Example I, N,N'-di-(1-methylpropylidene)-p-phenylenediamine is formed, and when this latter compound is hydrogenated in accord with step 2 of Example I, N,N'-di-(1-methylpropyl)-p-phenylenediamine is produced, the latter also being referred to as N,N'-di-(sec-butyl)-p-phenylenediamine.

Other ketones which are operable in the process of Example I include acetone and the butanones, pentanones, hexanones, heptanones, octanones, nonanones, decanones, including the isomers and higher homologues of the above ketones, as well as cyclic ketones such as acetophenone, cyclohexanone, and the like.

The carbonyl compound employed as the starting material in the process of Example I may be an aldehyde, such as ethanal, propanal, and the butanals, pentanals, hexanals, heptanals, octanals, nonanals, decanals, including the isomers and higher homologues of the above aldehydes, as well as cyclic aldehydes such as benzaldehyde, hexahydrobenzaldehyde, phenylacetaldehyde and the like.

It is here pointed out that where the carbonyl compound is water soluble, as for example, where the carbonyl compound is acetone, the reaction of step 1 should be carried out in an azeotroping agent, such as benzene, xylene and the like, in order to remove the water as it is formed in the reaction.

Thus, step 1 above may be also carried out by placing in a 5 liter 3-necked flask, equipped with a Stark-Dean trap, 1.5 liters of xylene and 1 liter of 2-octanone, and refluxing to remove any free water. After the flask contents are water free, that is, after refluxing until no more water is collected, then add the 216 g. (2 moles) of p-phenylenediamine and continue refluxing under the slight vacuum (60-80 mm.) as before, collecting and measuring the water from the reaction until the amount of water indicates the reaction is completed. The N,N'-di-(1-methylheptylidene)-p-phenylenediamine is isolated and employed in step 2, in the manner indicated above.

EXAMPLE II

The following example is illustrative of the process of this invention in which an N,N'-di-(mixed octyl)-p-phenylenediamine is formed in accord with the 3 step process starting with p-phenylenediamine, 2-octanone and 2-ethylhexanal.

*Step 1.*—Into a 500 milliliter flask equipped with a stirrer and Stark-Dean trap are placed 150 milliliters of xylene and 64 g. (0.5 mole) of 2-octanone, and refluxed to remove any free water. After the flask contents are water free, that is, after refluxing until no more water is collected, add 21.6 g. (0.2 mole) of p-phenylenediamine and continue refluxing under a vacuum of from 60 to 80 mm., the water from the reaction being collected and measured, until 3.4 milliliters of water have been collected.

*Step 2.*—Now add to the flask contents 55 g. (0.4 mole) of 2-ethylhexanal and continue refluxing under a slight vacuum, the water removed being collected and measured. When no further water is collected with longer refluxing, the water is measured, the amount being about 7.0 milliliters (the theoretical volume of water is 7.2 milliliters). The resulting N,N'-di-(mixed octylidene)-p-phenylenediamine may be represented by the general formula

*Step 3.*—In an absolutely dry hydrogenation bomb, there is placed 65.6 g. (0.2 mole) of the N,N'-di-(mixed octylidene)-p-phenylenediamine, and hydrogen admitted to the bomb, the hydrogenation being carried out at about 150° C. and about 1,500 p.s.i. When the hydrogen uptake stops, the hydrogen uptake measures about 0.4 mole, the theoretical uptake. The hydrogenated product is filtered to remove the catalyst, and distilled to remove the xylene solvent. The product so obtained weighs about 67 g., the theoretical being 66.4 g.

The N,N'-di-(mixed octyl)-p-phenylenediamine, when tested in a vulcanized rubber is found to be a very effective deterioration retarder.

As noted above in connection with Example I, other ketones than the ketone specified in Example II and other aldehydes than that included in Example II may be employed, in carrying out the three step process, the range of the ketones and aldehydes that may be employed being above indicated in connection with Example I. However, experience to date seems to indicate that the alpha-alkyl aldehydes are more effective in the three step process of Example II.

EXAMPLE III

In carrying out the processes of the above examples, the carbonyl compound should preferably be free of acidity. Where necessary, any acidity may be removed from the carbonyl compound, as 2-octanone and the 2-ethylhexanal of the preceding Example II, by washing with a 5-10% solution of sodium hydroxide, drying over NaSO₄ and then over CaO, filtering each time to remove any solid material. It is also feasible to neutralize the carbonyl compound with sodium carbonate, in place of the sodium hydroxide. The neutralized carbonyl compound is employed in the processes of the above examples in the manner herein more fully described.

The symmetrical di-alkyl-p-phenylenediamines prepared by the new and improved processes of this invention have a wide variety of uses as deterioration retarders of oxidizable organic materials, and are not limited to any specific function or use.

It is to be understood that variations and modifications within the scope of the appended claims may be made without departing from the spirit of this invention.

What is claimed is:

1. In the production of a N,N'-di-alkylidene-p-phenylenediamine in which the alkylidene group is selected from the class consisting of butylidene and octylidene radicals, the process which consists essentially in heating an admixture of p-phenylenediamine and a ketone selected from the class consisting of butanone and the octanones, at pressures ranging from a vacuum of around 50 mm. of mercury to substantially atmospheric pressure and at temperatures corresponding substantially to the boiling points of water at said pressures, removing from the reaction mixture the water of condensation as it is formed, continuing the heating until the reaction between the p-phenylenediamine and the ketone is from about 60% to 85% complete, then adding to the reaction mixture an aldehyde selected from the class consisting of butanal and octanal, continuing the heating and the removal of the water of condensation as it is formed, and recovering from the resulting admixture the N,N'-di-alkylidene-p-phenylenediamine.

2. In the production of a N,N'-di-octylidene-p-phenylenediamine, the process which consists essentially in heating an admixture of p-phenylenediamine and an octyl ketone at pressures ranging from a vacuum of around 50 mm. of mercury to substantially atmospheric pressure and at temperatures corresponding substantially to the boiling points of water at said pressures, removing from the reaction mixture the water of condensation as it is formed, continuing the heating until the reaction between the p-phenylenediamine and the octyl ketone is from 60% to 85% complete, then adding to the reaction mixture an octyl aldehyde, continuing the heating and the removal of the water of condensation as it is formed until substantially no further water of condensation is formed, and recovering from the resulting admixture the N,N'-di-octylidene-p-phenylenediamine.

3. In the production of a N,N'-di-(mixed octylidene)-p-phenylenediamine, the process which consists essentially in heating an admixture of p-phenylenediamine and 2-octanone at pressures ranging from a vacuum of around 50 mm. of mercury to substantially atmospheric pressure and at temperatures corresponding substantially to the boiling points of water at said pressures, removing the reaction mixture the water of condensation as it is formed, continuing the heating until the reaction between the p-phenylenediamine and the 2-octanone is from 60% to 85% complete, then adding to the reaction mixture 2-ethylhexanal, continuing the heating and the removal of the water of condensation as it is formed until substantially no further water of condensation is formed, and recovering from the resulting admixture the N,N'-di-(mixed octylidene)-p-phenylenediamine.

References Cited in the file of this patent

UNITED STATES PATENTS

| | | |
|---|---|---|
| 1,780,326 | Williams et al. | Nov. 4, 1930 |
| 1,804,398 | Cadwell et al. | May 12, 1931 |
| 1,945,576 | Ter Horst | Feb. 6, 1934 |
| 2,000,041 | Semon et al. | May 7, 1935 |

(Other references on following page)

UNITED STATES PATENTS

| | | |
|---|---|---|
| 2,045,574 | Adkins | June 30, 1936 |
| 2,218,587 | Reddelien | Oct. 22, 1940 |
| 2,264,894 | Shoemaker et al. | Dec. 2, 1941 |
| 2,464,291 | Chinicek | Mar. 15, 1949 |
| 2,533,723 | Dombrow | Dec. 12, 1950 |
| 2,883,362 | Rosenwald et al. | Apr. 21, 1959 |

FOREIGN PATENTS

| | | |
|---|---|---|
| 568,230 | Great Britain | Mar. 26, 1945 |
| 712,100 | Great Britain | July 21, 1954 |

OTHER REFERENCES

Guyot et al.: Societe Chimique de France, volume 47, pages 203–210 (1928).